(12) United States Patent
Yoshida et al.

(10) Patent No.: US 7,510,614 B2
(45) Date of Patent: Mar. 31, 2009

(54) HIGH STRENGTH BOLT EXCELLENT IN DELAYED FRACTURE RESISTANCE AND METHOD OF PRODUCTION OF SAME

(75) Inventors: Suguru Yoshida, Futtsu (JP); Toshimi Tarui, Futtsu (JP); Manabu Kubota, Futtsu (JP); Hideki Matsuda, Wako (JP); Tadashi Ohya, Wako (JP); Koki Mizuno, Wako (JP)

(73) Assignees: Nippon Steel Corporation, Tokyo (JP); Honda Motor Co., Ltd., Tokyo (JP)

( * ) Notice: Subject to any disclaimer, the term of this patent is extended or adjusted under 35 U.S.C. 154(b) by 68 days.

(21) Appl. No.: 11/490,975

(22) Filed: Jul. 21, 2006

(65) Prior Publication Data

US 2007/0017610 A1    Jan. 25, 2007

(30) Foreign Application Priority Data

Jul. 22, 2005    (JP) .............................. 2005-212216

(51) Int. Cl.
   *C22C 28/02*    (2006.01)
   *C22C 38/04*    (2006.01)
   *C22C 38/06*    (2006.01)
   *C21D 8/00*    (2006.01)

(52) U.S. Cl. .................. 148/320; 148/587; 148/330; 148/332; 148/334; 148/335; 148/336

(58) Field of Classification Search .................. 148/320, 148/334–336, 587, 330, 332, 573, 654, 663; 420/105, 106, 108–111, 123, 124
See application file for complete search history.

(56) References Cited

U.S. PATENT DOCUMENTS 3,489,620 A    1/1970    Current

FOREIGN PATENT DOCUMENTS

| GB | 1434948 | * | 5/1976 |
|----|---------|---|--------|
| JP | 05287440 |  | 11/1993 |
| JP | 07292434 |  | 11/1995 |
| JP | 07300652 |  | 11/1995 |
| JP | 09263875 |  | 10/1997 |
| JP | 2000337332 |  | 12/2000 |
| JP | 2001032044 |  | 2/2001 |
| JP | 2004231992 | * | 8/2004 |

OTHER PUBLICATIONS

Derwent Acc-No. 1994-011406 publication for English abstract of Japanese patent 05318018, H. Kusafuka, Dec. 3, 1993.*
Zhao et al., "A new technique of cold-heading the high-additional-value solts," China First Tractor Co., Ltd., Luo Yang 471004, China & Luoyang Longyu Electric Power Developing Group Co., Luoyang 471000, China, Oct. 2001, pp. 45-46 (w/ English language abstract).

* cited by examiner

*Primary Examiner*—Deborah Yee
(74) *Attorney, Agent, or Firm*—Kenyon & Kenyon LLP

(57) ABSTRACT

The present invention provides a high strength bolt excellent in delayed fracture resistance able to advantageously prevent hydrogen embrittlement as represented by the delayed fracture phenomenon occurring along with an increase in strength and causing a particular problem, and a method of production of the same, containing, by mass %, C: 0.2 to 0.6%, Si: 0.05 to 0.5%, Mn: 0.1 to 2%, Mo: 0.5 to 6%, and Al: 0.005 to 0.5%, having a tensile strength of 1400 MPa or more, and having a compressive residual stress of the surface layer of the thread root of 10 to 90% of the tensile strength. Further, a surface layer part of the thread root from the surface down to at least 50 μm has pre-austenite grains with an aspect ratio of the axial direction and radial direction of 2 or more and that part has a hardness of Hv 460 or more. Further, the method of production comprises using the steel material having the above ingredients to shape the bolt head and shaft, then heat the bolt to 900 to 1100° C., quench it, temper it by a 580° C. or higher temperature, then thread roll it.

5 Claims, No Drawings

HIGH STRENGTH BOLT EXCELLENT IN DELAYED FRACTURE RESISTANCE AND METHOD OF PRODUCTION OF SAME

BACKGROUND OF THE INVENTION

1. Field of the Invention

The present invention relates to a high strength bolt excellent in delayed fracture resistance and a method of production of the same, more particularly relates to a high strength bolt excellent in delayed fracture resistance having a 1400 MPa class or higher tensile strength and a method of production of the same.

2. Description of Related Art

The high strength bolts used in the automobile, general machinery, bridge, civil engineering, and other various industrial fields are made from steel such as the chromium steel (SCr) and chrome molybdenum steel (SCM) defined in the JIS G 4104 and JIS G 4105 with C concentrations, by mass %, of 0.20 to 0.35%, that is, medium carbon steels, which are quenched and tempered. However, it is known that when the above-mentioned steel materials exceed 1300 MPa in tensile strength, the risk of hydrogen embrittlement, in particular the risk of a delayed fracture phenomenon due to the hydrogen entering it from its environment during use, rises. For this reason, for example, in the case of use for construction, the use of SCr steel and SCM steel is presently limited to steel for a tensile strength of the 1150 MPa class. To enable safe use of material with a higher strength, the hydrogen embrittlement resistance as represented by the delayed fracture resistance has to be improved.

As a conventional discovery for improvement of the delayed fracture resistance of high strength steel, for example, Japanese Patent Publication (B2) No. 3-243744 proposes to make the pre-austenite grains in the microstructure finer, to transform the microstructure to a bainite structure, and otherwise control the microstructure.

Art for making the pre-austenite grains finer is proposed, in addition to the above-mentioned prior art, in Japanese Patent Publication (B2) No. 61-64815, Japanese Patent Publication (B2) No. 64-4566, and Japanese Patent Publication (B2) No. 3-243745 as well, but in each case, no great improvement in the delayed fracture resistance is achieved—as pointed out already in Japanese Patent Publication (A) No. 2000-26934.

Further, the method of transforming the microstructure to a bainite structure has a recognizable effect of improving the delayed fracture resistance, but the rise in the manufacturing costs required for transformation to a bainite structure becomes an issue. In addition, when transforming the microstructure to a bainite structure, in general the strength tends to drop compared with the case of a martensite structure. In particular, to secure a high strength such as the tensile strength of 1400 MPa or more shown in the present invention, further addition of alloying chemical ingredients and other measures are essential and therefore invite an increase in the manufacturing costs and result in less of an economic effect.

On the other hand, the above-mentioned Japanese Patent Publication (A) No. 2000-26934 proposes to diffuse and distribute single or composite precipitates of oxides, carbides, and nitrides into the steel for trapping the hydrogen and increase the amount of critical hydrogen causing delayed fracture (below, indicated as the "critical diffusable hydrogen amount") so as to improve the delayed fracture resistance. In this invention, as one mechanism for improving the delayed fracture resistance, the method of using carbides formed by quenching and tempering is mentioned. To improve this delayed fracture resistance, limitation of the chemical ingredients and the quenching, tempering, and other heat treatment conditions for the optimal diffusion and distribution of single or composite precipitates of oxides, carbides, and nitrides for trapping the hydrogen is essential.

SUMMARY OF THE INVENTION

An object of the present invention is to provide a high strength bolt excellent in delayed fracture resistance able to advantageously prevent hydrogen embrittlement as represented by the delayed fracture phenomenon occurring along with an increase in strength and causing a particular problem and a method of production of the same.

To achieve the above object, the inventors engaged in intensive studies on the chemical ingredients, method of production, and type of microstructure of steel materials, in particular, further studied, for the method of production, the working process including the step of bolt fabrication and the method of control of the microstructure and thereby first completed the present invention. The present invention has as its gist the following:

(1) A high strength bolt excellent in delayed fracture resistance containing, by mass %, C: 0.2 to 0.6%, Si: 0.05 to 0.5%, Mn: 0.1 to 2%, Mo: 0.5 to 6%, Al: 0.005 to 0.5%, and a balance of Fe and unavoidable impurities, having a tensile strength of 1400 MPa or more, and having a compressive residual stress of the surface layer of the thread root of 10 to 90% of the tensile strength.

(2) A high strength bolt excellent in delayed fracture resistance as set forth in (1), further containing, by mass %, one or more of V: 0.05 to 1%, Ti: 0.01 to 1%, and Nb: 0.01 to 1%.

(3) A high strength bolt excellent in delayed fracture resistance as set forth in (1) or (2), further containing, by mass %, one or more of Cr: 0.1 to 2%, Ni: 0.05 to 1%, Cu: 0.05 to 0.5%, and B: 0.0003 to 0.01%.

(4) A high strength bolt excellent in delayed fracture resistance as set forth in any one of (1) to (3), wherein a surface layer part of the thread root from the surface down to at least 50 μm has pre-austenite grains with an aspect ratio of the axial direction and radial direction of 2 or more.

(5) A high strength bolt excellent in delayed fracture resistance as set forth in any one of (1) to (4), wherein a surface layer part of the thread root from the surface down to at least 50 μm has a Vickers hardness of 460 or more.

(6) A high strength bolt excellent in delayed fracture resistance as set forth in any one of (1) to (5), wherein a delayed fracture critical diffusable hydrogen amount is 1 ppm or more.

(7) A method of production of a high strength bolt excellent in delayed fracture resistance comprising using a steel material having a composition of ingredients of any of the above (1) to (3) to shape a bolt head and shaft, then heating to 900° C. to 1100° C. in temperature range, quenching, tempering at 580° C. or more in temperature range, then thread rolling.

(8) A method of production of a high strength bolt excellent in delayed fracture resistance as set forth in the above (7), further comprising, after said thread rolling, heat treating at 150 to 500° C.

The present invention provides a high strength bolt having a tensile strength of 1400 MPa or more in which the hydrogen embrittlement resistance as represented by the delayed fracture resistance can be greatly improved. Application to the high strength bolts used in the automotive field first and foremost and in the general machinery and civil engineering fields becomes possible. The reduction of weight of the parts, the increase in efficiency, the improvement in safety, and other effects are extremely remarkable.

DESCRIPTION OF THE PREFERRED EMBODIMENTS

First, the reasons for limiting the chemical ingredients of the steel material in the present invention will be explained. Note that the % indicate mass %.

C is added as an effective ingredient for improving the strength of the steel, but if less than 0.2%, the steel is not sufficiently hardened at the time of the quenching heat treatment and the strength becomes insufficient. On the other hand, excessive addition over 0.6% results in an excessive rise in strength, a rise in the cracking susceptibility, and a drop in other basic material properties. Therefore, the C concentration was limited to a range of 0.2 to 0.6%.

Si functions as a deoxidizing element and also is an ingredient required for securing the strength of the base material, but if less than 0.05%, does not contribute much at all to improvement of the strength, while if over 0.5%, cannot be expected to give an effect commensurate with the amount of addition, so the Si concentration was limited to a range of 0.05 to 0.5%.

Mn has to be added in an amount of 0.1% or more in order to secure the strength and toughness of the base material, but addition over 2% results in an excessive rise in strength, increase in microsegregation, and other factors impairing the hydrogen embrittlement resistance. Therefore, the Mn concentration was limited to a range of 0.1 to 2%.

Mo is an alloy element for forming carbides. In the present invention, it is clear that not only does the precipitation of the carbides secure ordinary temperature and high temperature strength, but also the boundaries of the precipitate function as hydrogen trap sites. If less than 0.5%, sufficient strength and the hydrogen trap function cannot be exhibited, while if over 6%, the hardenability rises too much and the toughness of the base material is impaired. Therefore, the Mo concentration was limited to a range of 0.5 to 6%.

Al is a powerful deoxidizing element, but if less than 0.005%, a sufficient deoxidation effect is not obtained. On the other hand, even if over 0.5%, the effect becomes saturated. Therefore, the Al concentration was limited to a range of 0.005 to 0.5%.

In addition to the above-mentioned ingredients, in the present invention, one or more of V, Ti, and Nb may be selectively added.

V is an alloy element which, alone or together with the other carbide and carbonitride forming elements Mo, Ti, and Nb, forms carbides and carbonitrides to contribute to precipitation strengthening and improvement of the hydrogen trapping ability. If the amount of addition of V is less than 0.05%, the amount of precipitation of carbonitrides is insufficient and the above effects are not obtained, while if over 1%, the amount of precipitation of carbonitrides becomes excessive and the toughness is impaired. From the above, the V concentration was limited to a range of 0.05 to 1%.

Ti is an alloy element which, alone or other with V or Nb, forms carbonitrides. It contributes to precipitation strengthening and, further, as its precipitate functions as hydrogen traps, improves the delayed fracture and other hydrogen embrittlement resistance. If the Ti concentration is less than 0.01%, the amount of precipitation is insufficient, so the precipitation strengthening and the hydrogen trap function become insufficient, while if over 1%, the solution temperature becomes higher and the solution treatment in industrially utilized heating furnaces becomes insufficient, coarse carbonitrides are dispersed through the steel, and the contribution to precipitation strengthening and the hydrogen trapping ability become insufficient. Therefore, the Ti concentration was limited to a range of 0.01 to 1%.

Nb is an alloy element which, alone or other with V or Ti, forms carbonitrides. It contributes to precipitation strengthening and, further, as its precipitate functions as hydrogen traps, improves the delayed fracture and other hydrogen embrittlement resistance. If the Nb concentration is less than 0.01%, the amount of precipitation is insufficient, so the precipitation strengthening and the hydrogen trap function become insufficient, while if over 1%, the solution temperature becomes higher and the solution treatment in industrially utilized heating furnaces becomes insufficient, coarse carbonitrides are dispersed through the steel, and the contribution to precipitation strengthening and the hydrogen trapping ability become insufficient. Therefore, the Nb concentration was limited to a range of 0.01 to 1%.

Next, the reasons for limitation of the ranges of concentration of the alloy elements Cr, Ni, Cu, and B selectively added in the present invention in addition to the above-mentioned ingredients will be explained.

Cr is an element required for improving the hardenability and increasing the softening resistance at the time of tempering, but if less than 0.1%, the effect is not sufficiently exhibited, while if over 2%, a drop in the toughness and deterioration of the cold workability are invited. Therefore, the Cr concentration was limited to a range of 0.1 to 2%.

Ni is added to improve the ductility, which deteriorates along with an increase in strength, and to improve the hardenability at the time of heat treatment so as to improve the tensile strength. If the Ni concentration is less than 0.05%, the effect is small, while even if over 1%, an effect commensurate with the concentration cannot be exhibited, so the concentration was limited to 0.05 to 1%.

Cu is an element effective for improving the tempering softening resistance, but if less than 0.05%, that effect cannot be exhibited, while if over 0.5%, the hot workability falls, so the concentration was limited to 0.05 to 0.5%.

B has the effect of suppressing grain boundary fracture and improving the delayed fracture resistance. Further, B segregates at the pre-austenite grain boundaries to remarkably improve the hardenability, but if less than 0.0003%, that effect cannot be exhibited, while even if over 0.01%, the effect is saturated, so the B concentration was limited to 0.0003 to 0.01% in range.

The unavoidable impurities P, S, and N in the present invention are not particularly limited, but from the viewpoint of improving the delayed fracture resistance, preferably P is 0.015% or less, S is 0.06% or less, and N is 0.01% or less.

Next, the reasons for limitation of the residual stress of the surface layer part of the thread root of a bolt in the present invention will be explained.

When fastening a bolt, the bolt is given tensile stress in its longitudinal direction. At this time, the thread root is subjected to stress concentration. When leading to fracture, this thread root becomes the fracture starting point. When the thread root is given compressive residual stress, the tensile stress acting on the thread root at the time of bolt fastening is cancelled out by the compressive residual stress, the stress state at the starting point is eased, and fracture due to delayed fracture becomes more difficult. When the compressive residual stress of the surface layer of this thread root is less than 10% of the tensile strength, the effect of the tensile stress being cancelled out by the compressive residual stress becomes insufficient and the effect of suppressing delayed fracture becomes weak. On the other hand, even if the compressive residual stress of the surface layer of the thread root exceeds 90% of the tensile strength, the effect is saturated, so the compressive residual stress was limited to 10 to 90% of the tensile strength.

Next, the reasons for limitation of the microstructure of the surface layer of the thread root will be explained. The fracture plane around the starting point of delayed fracture is mainly intergranular fracture. When a crack occurring from the thread root is propagated to the center part, compared with when not flat, when the pre-austenite grains are flat in the axial direction, the grain boundaries are distributed at angles close to the perpendicular with respect to the radial directions and the crack propagation resistance of the pre-austenite grains increases. Expressing this crack propagation resistance by the aspect ratio of the axial direction and radial direction of the pre-austenite grains, if this aspect ratio is 2 or more, a sufficient angle is secured between the crack propagation direction and the grain boundary plane and the crack propagation resistance sufficiently functions. Further, intergranular fractures are distributed from the fracture starting point, that is, the outer surface of the surface layer, to a thickness of about 50 μm in the radial center direction. The aspect ratio was limited to this region. From the above, the microstructure of the surface layer of the thread root was limited to a condition of an aspect ratio of the axial direction and radial direction of the former austenite grains at the surface layer part from the surface down to at least 50 μm of 2 or more.

Further, to improve the hydrogen embrittlement resistance, in addition to the above-explained method of increasing the crack propagation resistance of the surface layer part, the method of improving the hydrogen trapping ability may also be mentioned. That is, this refers to the mechanism of creating a distribution of hydrogen trap sites at the surface layer part to improve the critical diffusable hydrogen amount leading to hydrogen embrittlement fracture (see *Tetsu-to-Hagane*, Vol. 83 (1997), p. 454) and improve the hydrogen embrittlement resistance. As the specific hydrogen trap sites able to be imparted to the surface layer part, introduction of dislocations by cold or hot working may be considered, so the hardness value rising along with working was used to define the conditions for improvement of the hydrogen embrittlement resistance. If the Vickers hardness value based on JIS Z 2244 is less than 460, the rise in the density of dislocations introduced by the working is insufficient, so the specific condition was made a Vickers hardness value of 460 or more. Further, the region where this hardness should be secured was limited to at least 50 μm thickness from the surface to the radial center direction because, as explained above, intergranular fractures are distributed over a thickness of about 50 μm from the surface layer, where fractures start, to the radial center direction, so to improve the hydrogen embrittlement resistance, improving the hydrogen trapping amount in this region is a required condition.

Next, the reason for defining the delayed fracture critical diffusable hydrogen amount of the bolts (see *Tetsu-to-Hagane*, Vol. 83 (1997), p. 454) to 1 ppm or more will be explained. The amount of hydrogen invading the steel from the environment is usually less than 1 ppm in most environments of use, so the condition of the delayed fracture critical diffusable hydrogen amount was made a critical diffusable hydrogen amount where the delayed fracture does not occur of 1 ppm or more. Note that a critical diffusable hydrogen amount of 1 ppm or more may be realized by selecting the chemical ingredients, heat treatment conditions, introduction of dislocation, and other working conditions etc. so as to cause the diffusion and distribution of precipitates functioning as hydrogen traps as explained above.

The ranges of limitation of the chemical ingredients set in the present invention are all included in the regions where alloy carbonitrides can precipitate, so for making such alloy carbonitrides function as hydrogen trap sites, a process of quenching to cause solution of the alloy elements, then tempering to cause reprecipitation of the alloy carbonitrides becomes essential. At this time, the range of the solution temperature before quenching is set to 900° C. to 1000° C. because if less than 900° C., the solution treatment becomes insufficient and undissolved carbides remain which do not function effectively to improve the strength and improve the delayed fracture properties, while if over 1000° C., remarkable growth of the austenite grains occurs and the coarser grains cause a drop in strength such as low stress fracture. The quenching is not particularly limited in medium and temperature so long as a cooling rate giving a martensite structure can be secured. Note that quenching medium may be an oil, water, a gas fluid, etc. Further, the tempering temperature is limited to 580° C. or more because with less than a 580° C. tempering temperature, the recrystallization is insufficient.

After the above-mentioned heat treatment, thread rolling is performed to improve the hydrogen embrittlement resistance by working as explained above at the bolt thread roots where delayed fracture and other hydrogen embrittlement easily start. While thread rolling by hot working, the pre-austenite grains increase in aspect ratio of the axial direction and radial direction, whereby the resistance to propagation of cracking increases and the hydrogen embrittlement resistance rises. On the other hand, when using cold working or hot working for thread rolling, dislocations are introduced into the surface layer part for improvement of the hydrogen trapping ability and thereby improvement of the hydrogen embrittlement resistance.

After thread rolling, the bolts are heat treated at 150 to 500° C. to suppress an excessive rise in hardness of the surface layer part and reduce the cracking susceptibility and thereby improve the hydrogen embrittlement resistance. If lower than 150° C. in temperature, the rise in hardness is insufficiently suppressed, while if higher than 500° C. in temperature, the hardness drops remarkably, so the 150 to 500° C. temperature range was limited to.

EXAMPLE

Below, examples will be used to more specifically explain the effects of the present invention. Rod steel materials were produced from the materials having the chemical ingredients shown in Tables 1 and 2. These were heat treated by solution treatment, quenching, and tempering in that order. Here, the quenching was 60° C. oil quenching. The thread rolling was classified into the two levels of rolling performed after tempering (in the table, shown by "after heat treatment") and rolling performed before solution quenching (in the table, shown by "before heat treatment"). Further, for the conditions of the further heat treatment of the bolts thread rolled "after heat treatment", the heat treatment temperatures are entered in the column "heat treatment temperature after thread rolling". When this column is blank, it means no repeated heat treatment was performed after the thread rolling.

The ranges of the aspect ratio, compressive residual stress, and hardness are limited for the surface layer part. Here, the "surface layer part" indicates the region from the bolt surface to center to a thickness of 50 μm. The aspect ratio was found by cutting the steel material perpendicularly to the axial direction of the bolt and examining the microstructure of the cross-section. The value was derived by measuring the aspect ratios of at least 20 randomly extracted former austenite grains by an optical microscope and employing the average value. For the hardness, the micro Vickers hardness was measured for at least three points of the surface layer part of the same cross-section as the above at a load of 500 gf and the average value was employed. The compressive residual stress was measured by the X-ray diffraction method and expressed by the ratio (%) with respect to the tensile strength.

The critical diffusable hydrogen amount was found by using the electrolytic charging method (method of dipping a steel material into an ammonium thiocyanate aqueous solution and in that state generating an anode potential at the surface of the steel material to introduce hydrogen into the steel material) to introduce various concentrations of hydrogen into the bolts, plating the surfaces by Cd to prevent scattering and loss of the hydrogen in the bolts, then holding the bolts under conditions of a tensile stress of 90% of the tensile strength by a constant load tester for a maximum of 100 hours, measuring the bolts fracturing and bolts not fracturing during that interval for the amount of hydrogen by temperature rise analysis using a gas chromatograph, defining the maximum hydrogen amount of the bolts not fracturing as the critical diffusable hydrogen amount, and evaluating the hydrogen concentration. Note that the diffusible hydrogen amount indicates the hydrogen which scatters when the steel is left standing at room temperature and, in the present invention, is defined as the cumulative amount of hydrogen released from room temperature to 400° C. by analysis of the temperature rise of 100° C./hr.

The invention steels are Test Nos. 1 to 16 in Table 1. The comparative steels shown by Test Nos. 17 to 37 all have at least one of the ingredients, production conditions (heat treatment or thread rolling timing), surface layer part microstructure (aspect ratio) and mechanical properties (compressive residual stress and Vickers hardness), and critical diffusable hydrogen amount outside the scope of claims of the present invention.

Note that among the data of the ingredient conditions, production conditions, microstructure, and mechanical properties of the comparative steels of Table 2, data outside the scope of the claims of the present invention are shown underlined.

TABLE 1

| Test No. | Class | Chemical ingredients (mass %) | | | | | | | | | | | | | | |
|---|---|---|---|---|---|---|---|---|---|---|---|---|---|---|---|---|
| | | C | Si | Mn | Mo | Al | V | Ti | Nb | Cr | Ni | Cu | B | P | S | N |
| 1 | Inv. steel | 0.45 | 0.05 | 0.50 | 4.00 | 0.007 | — | — | — | — | — | — | — | 0.014 | 0.045 | 0.0046 |
| 2 | Inv. steel | 0.30 | 0.05 | 1.00 | 2.50 | 0.007 | — | — | — | — | — | — | — | 0.010 | 0.050 | 0.0055 |
| 3 | Inv. steel | 0.25 | 0.05 | 2.00 | 3.00 | 0.007 | — | — | — | — | — | — | — | 0.011 | 0.048 | 0.0043 |
| 4 | Inv. steel | 0.52 | 0.05 | 0.30 | 2.80 | 0.009 | — | — | — | — | — | — | — | 0.012 | 0.049 | 0.0045 |
| 5 | Inv. steel | 0.31 | 0.05 | 1.80 | 3.00 | 0.009 | — | — | — | — | — | — | — | 0.014 | 0.055 | 0.0051 |
| 6 | Inv. steel | 0.40 | 0.05 | 0.50 | 2.00 | 0.010 | 0.10 | — | — | — | — | — | — | 0.014 | 0.059 | 0.0075 |
| 7 | Inv. steel | 0.48 | 0.05 | 0.45 | 2.10 | 0.009 | 0.35 | — | — | — | — | — | — | 0.013 | 0.051 | 0.0085 |
| 8 | Inv. steel | 0.40 | 0.05 | 0.50 | 0.80 | 0.012 | 0.35 | — | — | — | — | — | — | 0.010 | 0.045 | 0.0047 |
| 9 | Inv. steel | 0.40 | 0.05 | 0.50 | 4.10 | 0.010 | 0.15 | 0.03 | — | — | — | — | — | 0.011 | 0.043 | 0.0042 |
| 10 | Inv. steel | 0.45 | 0.05 | 0.50 | 2.00 | 0.030 | 0.20 | — | 0.04 | — | — | — | — | 0.011 | 0.058 | 0.0077 |
| 11 | Inv. steel | 0.40 | 0.05 | 0.50 | 2.00 | 0.010 | — | — | — | 1.20 | — | — | — | 0.012 | 0.053 | 0.0044 |
| 12 | Inv. steel | 0.40 | 0.05 | 0.50 | 2.00 | 0.010 | — | — | — | — | 0.75 | — | — | 0.015 | 0.059 | 0.0040 |
| 13 | Inv. steel | 0.42 | 0.05 | 0.50 | 2.50 | 0.009 | — | — | — | — | 0.60 | 0.60 | — | 0.010 | 0.055 | 0.0048 |
| 14 | Inv. steel | 0.35 | 0.10 | 0.60 | 2.00 | 0.007 | 0.15 | — | — | 1.00 | — | — | — | 0.011 | 0.045 | 0.0070 |
| 15 | Inv. steel | 0.35 | 0.10 | 0.60 | 2.80 | 0.008 | 0.15 | 0.02 | — | — | — | 0.60 | — | 0.013 | 0.049 | 0.0071 |
| 16 | Inv. steel | 0.40 | 0.10 | 0.50 | 2.50 | 0.009 | 0.15 | — | — | 1.20 | 0.30 | 0.30 | 0.0024 | 0.012 | 0.052 | 0.0046 |

| Test No. | Solution temperature ° C. | Tempering temperature ° C. | Thread rolling timing | Heat treatment temperature after thread rolling ° C. | Surface layer part aspect ratio | Surface layer part compressive residual stress (%) | Surface layer part hardness | Critical diffusible hydrogen (ppm) | Tensile strength (MPa) |
|---|---|---|---|---|---|---|---|---|---|
| 1 | 900 | 590 | After heat treatment | — | 2.1 | 28 | 627 | 1.6 | 1492 |
| 2 | 900 | 600 | After heat treatment | — | 2.0 | 22 | 567 | 1.8 | 1432 |

TABLE 1-continued

| | | | | | | | | | | |
|---|---|---|---|---|---|---|---|---|---|---|
| 3 | 925 | 600 | After heat treatment | — | 2.1 | 44 | 670 | 2.7 | 1405 | |
| 4 | 925 | 600 | After heat treatment | 200 | 2.4 | 39 | 682 | 1.2 | 1488 | |
| 5 | 925 | 600 | After heat treatment | 200 | 2.1 | 35 | 705 | 1.7 | 1575 | |
| 6 | 925 | 600 | After heat treatment | — | 2.1 | 51 | 806 | 2.4 | 1621 | |
| 7 | 925 | 620 | After heat treatment | — | 2.2 | 34 | 779 | 1.2 | 1822 | |
| 8 | 925 | 600 | After heat treatment | — | 2.0 | 44 | 874 | 1.2 | 1864 | |
| 9 | 950 | 630 | After heat treatment | 160 | 2.4 | 31 | 772 | 1.4 | 1792 | |
| 10 | 950 | 630 | After heat treatment | 200 | 2.1 | 51 | 831 | 1.2 | 1705 | |
| 11 | 900 | 610 | After heat treatment | — | 2.1 | 45 | 786 | 1.2 | 1642 | |
| 12 | 900 | 590 | After heat treatment | — | 2.2 | 41 | 756 | 1.3 | 1637 | |
| 13 | 925 | 600 | After heat treatment | 300 | 2.0 | 51 | 837 | 2.8 | 1688 | |
| 14 | 900 | 600 | After heat treatment | 300 | 2.2 | 79 | 890 | 2.1 | 1504 | |
| 15 | 925 | 600 | After heat treatment | — | 3.0 | 61 | 863 | 2.4 | 1634 | |
| 16 | 950 | 620 | After heat treatment | 300 | 2.4 | 34 | 734 | 1.8 | 1685 | |

*: Low stress fracture

TABLE 2

| Test No. | Class | Chemical ingredients (mass %) | | | | | | | | | | | | | | |
|---|---|---|---|---|---|---|---|---|---|---|---|---|---|---|---|---|
| | | C | Si | Mn | Mo | Al | V | Ti | Nb | Cr | Ni | Cu | B | P | S | N |
| 17 | Comp. steel | 0.15 | 0.05 | 0.50 | 2.00 | 0.010 | 0.15 | — | — | — | — | — | — | 0.012 | 0.056 | 0.0044 |
| 18 | Comp. steel | 0.40 | 0.05 | 0.50 | 0.20 | 0.009 | — | 0.08 | — | — | — | — | — | 0.011 | 0.058 | 0.0088 |
| 19 | Comp. steel | 0.40 | 0.05 | 1.00 | 2.00 | 0.012 | 0.10 | 1.50 | — | 1.20 | — | — | 0.0020 | 0.013 | 0.051 | 0.0042 |
| 20 | Comp. steel | 0.42 | 0.05 | 1.00 | 2.50 | 0.012 | 0.10 | — | 1.30 | — | — | — | 0.0022 | 0.015 | 0.049 | 0.0041 |
| 21 | Comp. steel | 0.70 | 0.05 | 0.70 | 2.50 | 0.009 | 0.10 | — | 0.04 | — | — | — | — | 0.014 | 0.055 | 0.0046 |
| 22 | Comp. steel | 0.45 | 0.05 | 0.50 | 4.00 | 0.007 | — | — | — | — | — | — | — | 0.010 | 0.052 | 0.0051 |
| 23 | Comp. steel | 0.30 | 0.05 | 1.00 | 2.50 | 0.007 | — | — | — | — | — | — | — | 0.17 | 0.056 | 0.0048 |
| 24 | Comp. steel | 0.25 | 0.05 | 2.00 | 3.00 | 0.007 | — | — | — | — | — | — | — | 0.014 | 0.049 | 0.0044 |
| 25 | Comp. steel | 0.52 | 0.05 | 0.30 | 2.80 | 0.009 | — | — | — | — | — | — | — | 0.015 | 0.045 | 0.0082 |
| 26 | Comp. steel | 0.31 | 0.05 | 1.80 | 3.00 | 0.009 | — | — | — | — | — | — | — | 0.009 | 0.048 | 0.0068 |
| 27 | Comp. steel | 0.40 | 0.05 | 0.50 | 2.00 | 0.010 | 0.10 | — | — | — | — | — | — | 0.016 | 0.055 | 0.0044 |
| 28 | Comp. steel | 0.48 | 0.05 | 0.45 | 2.10 | 0.009 | 0.35 | — | — | — | — | — | — | 0.014 | 0.058 | 0.0041 |
| 29 | Comp. steel | 0.40 | 0.05 | 0.50 | 0.80 | 0.012 | 0.35 | — | — | — | — | — | — | 0.012 | 0.053 | 0.0046 |
| 30 | Comp. steel | 0.40 | 0.05 | 0.50 | 4.10 | 0.010 | 0.15 | 0.03 | — | — | — | — | — | 0.015 | 0.053 | 0.0051 |
| 31 | Comp. steel | 0.45 | 0.05 | 0.50 | 2.00 | 0.030 | 0.20 | — | 0.04 | — | — | — | — | 0.011 | 0.049 | 0.0042 |
| 32 | Comp. steel | 0.40 | 0.05 | 0.50 | 2.00 | 0.010 | — | — | — | 1.20 | — | — | — | 0.015 | 0.055 | 0.0044 |
| 33 | Comp. steel | 0.40 | 0.05 | 0.50 | 2.00 | 0.010 | — | — | — | — | 0.75 | — | — | 0.012 | 0.050 | 0.0047 |
| 34 | Comp. steel | 0.42 | 0.05 | 0.50 | 2.50 | 0.009 | — | — | — | — | 0.60 | 0.60 | — | 0.013 | 0.049 | 0.0043 |

TABLE 2-continued

| | | C | Si | Mn | Mo | ... | Al | ... | ... | ... | ... | ... | ... | ... | ... | ... |
|---|---|---|---|---|---|---|---|---|---|---|---|---|---|---|---|---|
| 35 | Comp. steel | 0.35 | 0.10 | 0.60 | 2.00 | 0.007 | 0.15 | — | — | 1.00 | — | — | — | 0.014 | 0.055 | 0.0044 |
| 36 | Comp. steel | 0.35 | 0.10 | 0.60 | 2.80 | 0.008 | 0.15 | 0.02 | — | — | — | 0.60 | — | 0.014 | 0.056 | 0.0045 |
| 37 | Comp. steel | 0.40 | 0.10 | 0.50 | 2.50 | 0.009 | 0.15 | — | — | 1.20 | 0.30 | 0.30 | 0.0019 | 0.011 | 0.059 | 0.0046 |

| Test No. | Solution temperature °C. | Tempering temperature °C. | Thread rolling timing | Heat treatment temperature after thread rolling °C. | Surface layer part aspect ratio | Surface layer part compressive residual stress (%) | Surface layer part hardness | Critical diffusible hydrogen amount (ppm) | Tensile strength (MPa) |
|---|---|---|---|---|---|---|---|---|---|
| 17 | 900 | 580 | After heat treatment | 200 | 2.2 | 21 | <u>360</u> | 3.0> | <u>1012</u> |
| 18 | 900 | 600 | After heat treatment | — | 2.1 | 16 | <u>427</u> | ≤0.1 | <u>1236</u> |
| 19 | 950 | 650 | After heat treatment | 200 | 2.3 | 12 | 550 | 0.7 | 1689 |
| 20 | 1000 | 650 | After heat treatment | 200 | 2.0 | 15 | 578 | 0.5 | 1814 |
| 21 | 950 | 630 | After heat treatment | — | 2.1 | 17 | 595 | ≤0.1 | 1924 |
| 22 | 900 | 590 | After heat treatment | — | <u>1.3</u> | <u>4</u> | 450 | 0.4 | 1477 |
| 23 | <u>1120</u> | 600 | After heat treatment | 160 | 2.1 | 25 | 473 | ≤0.1 | <u>1102</u>* |
| 24 | 925 | 600 | After heat treatment | — | <u>1.3</u> | <u>6</u> | <u>427</u> | 1.4 | <u>1389</u> |
| 25 | 925 | <u>550</u> | After heat treatment | 200 | 2.2 | 13 | 463 | 0.2 | <u>1411</u> |
| 26 | 925 | 600 | <u>Before heat treatment</u> | 200 | <u>1.2</u> | <u>8</u> | 471 | 0.2 | 1559 |
| 27 | 925 | 600 | <u>Before heat treatment</u> | — | <u>1.3</u> | <u>4</u> | 478 | 0.4 | 1603 |
| 28 | 925 | <u>500</u> | After heat treatment | — | 2.1 | 15 | 527 | 0.9 | 1670 |
| 29 | <u>1120</u> | 600 | After heat treatment | — | 2.2 | 27 | 596 | ≤0.1 | <u>1221</u>* |
| 30 | 950 | 630 | <u>Before heat treatment</u> | — | <u>1.2</u> | <u>5</u> | <u>433</u> | 0.9 | 1732 |
| 31 | <u>860</u> | 630 | After heat treatment | 200 | 2.1 | 14 | 471 | 0.2 | <u>1387</u> |
| 32 | 900 | <u>500</u> | After heat treatment | — | 2.2 | 9 | 496 | 0.1 | <u>1480</u> |
| 33 | 900 | 590 | <u>Before heat treatment</u> | — | <u>1.3</u> | 14 | 501 | 0.5 | 1622 |
| 34 | 925 | 600 | After heat treatment | 650 | 2.2 | <u>9</u> | 489 | 0.9 | <u>1490</u> |
| 35 | 900 | 600 | <u>Before heat treatment</u> | 300 | <u>1.2</u> | <u>6</u> | <u>431</u> | 0.8 | <u>1465</u> |
| 36 | <u>850</u> | 600 | After heat treatment | — | 2.1 | 14 | <u>451</u> | 0.4 | <u>1359</u> |
| 37 | 950 | 620 | <u>Before heat treatment</u> | 300 | <u>1.1</u> | <u>5</u> | 497 | 0.7 | 1655 |

*Low stress fracture

The invention claimed is:

1. A high strength bolt excellent in delayed fracture resistance containing, by mass %,
C: 0.2 to 0.6%,
Si: 0.05 to 0.5%,
Mn: 0.1 to 2%,
Mo: 0.5 to 6%,
Al: 0.005 to 0.5%, and
a balance of Fe and unavoidable impurities,
having a tensile strength of 1400 MPa or more, and having a compressive residual stress of the surface layer of the thread root of 10 to 90% of the tensile strength.
wherein the surface layer part of the thread root from the surface down to at least 50 pm having pre-austenite grains with an aspect ratio of the axial direction and radial direction of 2 or more and having a Vickers hardness of 460 or more.

2. A high strength bolt excellent in delayed fracture resistance as set forth in claim 1, further containing, by mass %, one or more of
V: 0.05 to 1%,
Ti: 0.01 to 1%,
Nb: 0.01 to 1%,
Cr: 0.1 to 2%,
Ni: 0.05 to less than 0.5%,
Cu: 0.05 to less than 0.5%. and,
B: 0.0003 to 0.01%.

3. A high strength bolt excellent in delayed fracture resistance as set forth in claim 1, wherein a delayed fracture critical diffusable hydrogen amount is 1 ppm or more.

4. A method of production of a high strength bolt excellent in delayed fracture resistance comprising using a steel material having a composition of ingredients of claim 1 to shape a bolt head and shaft, then heating to 900° C. to 1100° C. in temperature range, quenching, tempering at 580° C. or more in temperature range, then thread rolling.

5. A method of production of a high strength bolt excellent in delayed fracture resistance as set forth in claim 4, further comprising, after said thread rolling, heat treating at 150 to 500° C.

* * * * *